United States Patent
Ryu et al.

(10) Patent No.: US 9,469,544 B2
(45) Date of Patent: Oct. 18, 2016

(54) METHOD FOR MANUFACTURING POLYSILICON

(71) Applicant: HANWHA CHEMICAL CORPORATION, Seoul (KR)

(72) Inventors: Hyun-Cheol Ryu, Daejeon (KR); Jea Sung Park, Daejeon (KR); Dong-Ho Lee, Daejeon (KR); Eun-Jeong Kim, Daejeon (KR); Gui Ryong Ahn, Daejeon (KR); Sung Eun Park, Seoul (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/366,063

(22) PCT Filed: Sep. 26, 2012

(86) PCT No.: PCT/KR2012/007759
§ 371 (c)(1),
(2) Date: Jun. 17, 2014

(87) PCT Pub. No.: WO2013/094855
PCT Pub. Date: Jun. 27, 2013

(65) Prior Publication Data
US 2014/0356535 A1    Dec. 4, 2014

(30) Foreign Application Priority Data
Dec. 19, 2011  (KR) .................. 10-2011-0137506

(51) Int. Cl.
*C01B 33/035* (2006.01)
*B01J 19/24* (2006.01)

(52) U.S. Cl.
CPC .............. *C01B 33/035* (2013.01); *B01J 19/24* (2013.01); *B01J 2219/002* (2013.01); *B01J 2219/00135* (2013.01); *B01J 2219/00186* (2013.01); *B01J 2219/00231* (2013.01)

(58) Field of Classification Search
None
See application file for complete search history.

(56) References Cited

U.S. PATENT DOCUMENTS

| | | | |
|---|---|---|---|
| 8,398,946 B2 | 3/2013 | Hertlein | |
| 2008/0056979 A1* | 3/2008 | Arvidson | C01B 33/03 423/350 |
| 2011/0014468 A1 | 1/2011 | Urushihara et al. | |
| 2011/0104035 A1 | 5/2011 | Lovtsus et al. | |
| 2011/0274926 A1* | 11/2011 | Oda | C01B 33/035 428/378 |

FOREIGN PATENT DOCUMENTS

| | | |
|---|---|---|
| CN | 101956232 | 1/2011 |
| CN | 102026919 | 4/2011 |
| DE | 102007047210 | 4/2009 |
| JP | 2003-128492 A | 5/2003 |
| JP | 2011-037699 | 2/2011 |
| JP | 2011-068553 A | 4/2011 |
| JP | 2011-520757 | 7/2011 |
| KR | 10-2011-0007043 A | 1/2011 |

OTHER PUBLICATIONS

International Search Report prepared by the Korean Intellectual Property Office on Mar. 5, 2013, for International Application No. PCT/KR2012/007759.

* cited by examiner

*Primary Examiner* — Joseph Miller, Jr.
(74) *Attorney, Agent, or Firm* — Lex IP Meister, PLLC

(57) ABSTRACT

The present invention relates to a method for manufacturing polysilicon. According to the present invention, meltdown can be prevented during the growth of silicon rod, and a polycrystalline silicon rod having a larger diameter can be shortly manufactured with a minimal consumption of energy.

4 Claims, 1 Drawing Sheet

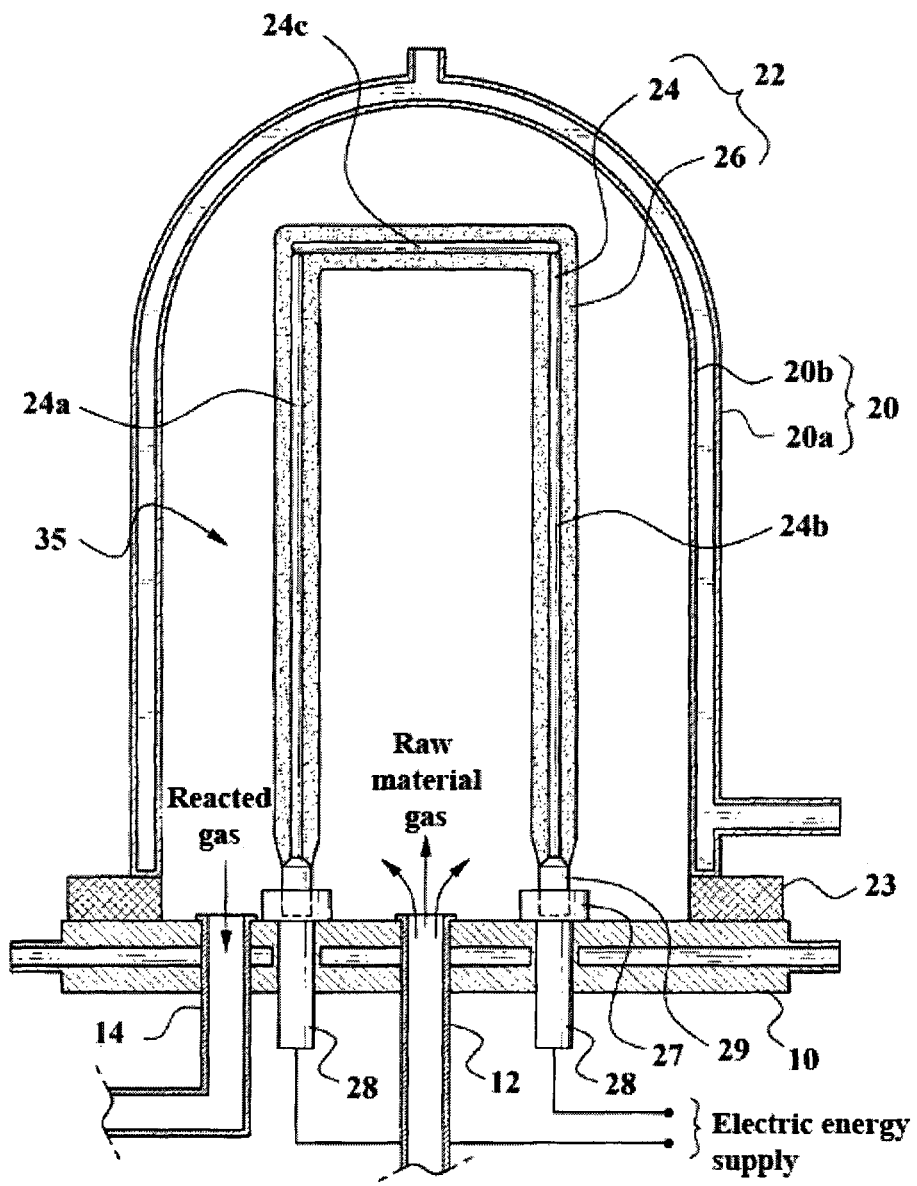

METHOD FOR MANUFACTURING POLYSILICON

CROSS REFERENCE TO RELATED APPLICATIONS

This application is a national stage application under 35 U.S.C. 371 of PCT Application No. PCT/KR2012/007759 having an international filing date of 26 Sep. 2012, which designated the United States, which PCT application claimed the benefit of Korean Application No. 10-2011-0137506 filed 19 Dec. 2011, the entire disclosure of each of which is incorporated herein by reference.

TECHNICAL FIELD

The present invention relates to a method for manufacturing polysilicon.

BACKGROUND OF ART

Polycrystalline silicon, commonly known as polysilicon, is used as a basic raw material for photovoltaic and semiconductor industries, and the demand for polysilicon is rapidly growing with recent development of the industries.

The method of manufacturing polysilicon is represented by a silicon deposition process (or chemical vapor deposition) which produces a solid phase of polysilicon from a raw material, silane gas.

According to the silicon deposition process, silicon fine particles are generated from the silane raw material gas through hydrogen reduction and thermal decomposition under a high-temperature circumstance, and the generated silicon fine particles are deposited in a form of polycrystalline on the surface of rods or particles. For example, a Siemens deposition method using a chemical vapor deposition reactor and a deposition method using a fluidized bed reactor are known.

In the silicon deposition process, there is a method of increasing an amount of raw material supply as one of methods of increasing a growth rate of polycrystalline silicon. However, it is not preferable that the raw material gas is excessively supplied, because a ratio of the raw material gas contributing to the deposition reaction is decreased to reduce a deposition amount (yield) of polycrystalline silicon.

Meanwhile, the silicon rod applied to the Siemens deposition method should maintain a surface temperature suitable for the deposition of polycrystalline silicon, and a temperature difference between the center and the surface of the rod increases due to convection, as the rod grows. Accordingly, when the rod grows to some extent and the temperature of the center portion of the rod reaches a melting point of polycrystalline silicon, meltdown is likely to easily occur. Thus, there is a problem in that the rod cannot be grown to have a large diameter of, for example, 150 mm or larger.

Therefore, many methods have been suggested in order to grow the rod diameter without meltdown of the rod. However, the reaction yield is still lowered, and there is an inconvenience such as modification of the reactor structure. Thus, there is a need to develop a technique of improving the drawbacks.

DETAILED DESCRIPTION OF THE INVENTION

Technical Objectives

Accordingly, the present invention provides a method for manufacturing polysilicon, in which meltdown is prevented during the growth of silicon rod and polycrystalline silicon rod having a diameter of 150 mm or larger can be shortly manufactured without modification of the reactor structure with a minimal consumption of energy.

Technical Solution

According to one embodiment of the present invention, provided is a method for manufacturing polysilicon, comprising the steps of:

reacting a raw material gas containing dichlorosilane and trichlorosilane with a reducing gas to deposit polycrystalline silicon on a silicon rod in a reactor provided with the hot silicon rod; and adjusting a molar ratio of dichlorosilane to trichlorosilane contained in the raw material gas according to the reaction progress during the deposition step of polycrystalline silicon.

According to another embodiment of the present invention, the manufacturing method may be adjusted to have a molar ratio of dichlorosilane to trichlorosilane contained in the raw material gas of 10 mol % or more at any point of the deposition step.

Meanwhile, according to still another embodiment of the present invention, the deposition step of polycrystalline silicon may be performed to have a molar ratio of dichlorosilane to trichlorosilane contained in the raw material gas of 10 to 65 mol % until the process of the following Formula is progressed to any point of 20 to 50%; and less than 10 mol % until the reaction is terminated since the above point:

$$\text{Progress rate of process}(\%) = \{(D_T - D_0)/(D_E - D_0)\} \times 100 \quad \text{[Formula]}$$

wherein $D_0$ is a diameter of silicon rod before reaction, $D_E$ is a diameter of silicon rod after termination of reaction, and $D_T$ is a diameter of silicon rod at any point of reaction ($D_0 \leq D_T \leq D_E$).

According to still another embodiment of the present invention, the deposition step of polycrystalline silicon may be performed to have a molar ratio of dichlorosilane to trichlorosilane contained in the raw material gas of less than 10 mol % until the process of the above Formula is progressed to any point of 50 to 95%; and 10 to 65 mol % until the reaction is terminated since the above point.

According to still another embodiment of the present invention, the deposition step of polycrystalline silicon may be performed to have a molar ratio of dichlorosilane to trichlorosilane contained in the raw material gas of 10 to 65 mol % until the process of the above Formula is progressed to any point of 20 to 50% (first point);

less than 10 mol % until the process of the above Formula is progressed to any point of 50 to 95% (second point) since the above point (first point); and 10 to 65 mol % until the reaction is terminated since the above point (second point).

According to still another embodiment of the present invention, the deposition step of polycrystalline silicon may be adjusted to have an average molar ratio of dichlorosilane to trichlorosilane contained in the raw material gas of 10 mol % or more according to the reaction progress. Herein, the deposition step may be preferably adjusted to have a molar ratio of dichlorosilane to trichlorosilane contained in the raw material gas of 10 mol % or more throughout the entire step.

Meanwhile, according to still another embodiment of the present invention, the deposition step of polycrystalline silicon may be performed to maintain the center temperature of the silicon rod below a melting point of polycrystalline silicon.

Meanwhile, the raw material gas may be pre-heated to 50 to 500° C. and supplied to a reactor.

The reducing gas may be hydrogen ($H_2$) gas.

Further, a molar ratio of the reducing gas to the raw material gas may be 1:1 to 1:40.

The surface temperature of the silicon rod may be maintained at 1000 to 1200° C.

The silicon rod produced by the deposition step may have a final diameter of 140 to 200 mm.

Advantageous Effect of the Invention

The method for manufacturing polysilicon according to the present invention can be used to prevent meltdown during the growth of silicon rod and to shortly manufacture a polycrystalline silicon rod having a diameter of 150 mm or larger with a minimal consumption of energy, and thus it is advantageous in terms of productivity and energy efficiency.

DESCRIPTION OF DRAWINGS

FIG. 1 is a cross-sectional view of Siemens-type chemical vapor deposition reactor that can be applied to the manufacturing method according to one embodiment of the present invention.

(Reference Numerals)

| | |
|---|---|
| 10: Base plate | 12: Gas inlet |
| 14: Gas outlet | 20: Bell-shaped reactor |
| 20a: Chamber cover | 20b: Bell jar |
| 22: Polysilicon rod | 23: Gas-tight flange |
| 24: Rod filaments | 24a, 24b: Vertical rod filaments |
| 24c: Horizontal rod filament | 26: Polysilicon rod deposition |
| 27: Rod support | 28: Electrical feedthroughs |
| 29: Electrode | 35: Reaction chamber |

MODE FOR PRACTICING THE INVENTION

Hereinafter, a method for manufacturing polysilicon according to one embodiment of the present invention will be described.

The present inventors have made many studies to develop the method for manufacturing polysilicon, and they found that a composition of silane compounds contained in the raw material gas is controlled according to the reaction progress of silicon deposition process so as to increase a growth rate of rod at the initial stage of the reaction and to prevent meltdown of the rod at the later stage of the reaction, thereby manufacturing the rod with a larger diameter. In addition, they found that the productivity of polysilicon can be increased by using the above method without modification of the reactor and with a minimal consumption of energy, thereby completing the present invention.

According to one embodiment of the present invention, provided is a method for manufacturing polysilicon, comprising the steps of:

reacting a raw material gas containing dichlorosilane and trichlorosilane with a reducing gas to deposit polycrystalline silicon on a silicon rod in a reactor provided with the hot silicon rod; and adjusting a molar ratio of dichlorosilane to trichlorosilane contained in the raw material gas according to the reaction progress during the deposition step of polycrystalline silicon.

First, according to the present invention, the deposition step of polycrystalline silicon may be performed in a reactor provided with the hot silicon rod.

The reactor may be a bell jar reactor used in a Siemens deposition method or the like. Its structure is not particularly limited, as long as it is provided with the hot silicon rod, and a reactor shown in FIG. 1 may be used.

FIG. 1 is a cross-sectional view of Siemens-type chemical vapor deposition (CVD) reactor that can be applied to the manufacturing method according to one embodiment of the present invention, in which a bell-shaped reactor 20 is generally fixed on a base plate 10 with a gas-tight flange 23, one or more reaction chambers 35 are provided inside, and the bell-shaped reactor 20 includes a chamber cover 20a and a bell jar 20b, and a coolant flows therebetween.

Meanwhile, the base plate 10 is provided with a gas inlet 12 and a gas outlet 14. The raw material gas flow into the reaction chamber 35 through the gas inlet 12 connected to a silicon-containing gas source, and the gas after CVD reaction is discarded outside the reaction chamber 35 through the gas outlet 14. Also, two electrical feedthroughs 28 extend from the outside of the base plate 10 into the reaction chamber 35, and each end portion thereof is connected to an electrode 29 made of graphite, for example, while supported by a rod support 27.

In the reaction chamber 35, one or more sets of rod filaments 24 are provided. Specifically, one set of rod filaments 24 forms a U-shaped rod with two vertical rod filaments 24a, 24b standing apart with an interval in the reaction chamber 35 and a horizontal rod filament 24c connecting top end portions of the two vertical rod filaments. Further, each of bottom end portions of the two vertical rod filaments 24a, 24b is connected to an external electrical power supply through an electrode 29 and the electrical feedthrough 28, and thus the one set of rod filament 24 forms a complete electrical circuit. In this Siemens CVD reactor device, a current flows in the rod filament 24 through the electrical feedthrough 28 and the electrode 29 for a CVD process, and the raw material gas is supplied to the reaction chamber 35. Then, the rod filament 24 is heated and pyrolysis of a chlorosilane compound contained in the raw material gas occurs in the reaction chamber 35.

As such, the polysilicon is produced by chemical vapor deposition (CVD) after decomposition of the chlorosilane compound onto the glowing hot rod filament 24. Silicon is deposited on the surface of the silicon rod in a form of polycrystalline, and a depositing polysilicon rod 26 is increased to have a desired diameter, at which point the reactor device is shut down, its process gases are purged from the reaction chamber 35, and the reactor 20 is opened for harvesting the polysilicon rod 22.

Meanwhile, in the method for manufacturing polysilicon according to the present invention, the raw material gas may include dichlorosilane (hereinbelow, referred to as 'DCS') and trichlorosilane (hereinbelow, referred to as 'TCS').

In the previous methods for manufacturing polysilicon, TCS ($SiHCl_3+H_2 \rightarrow Si+SiHCl_3+SiCl_4+HCl+H_2$) or monosilane ($SiH_4 \rightarrow Si+H_2$) was mainly used as the raw material gas, considering the deposition temperature of silicon. That is, tetrachlorosilane ($SiCl_4$) has a limitation as the raw material gas because it has the problems such as high deposition temperature of silicon (approximately 1150° C. or higher) and production of by-products having high boiling point. DCS has been hardly used as the raw material gas, because it shows lower productivity (such as yield) than TCS or monosilane. If used, DCS has been used in the form of mixture with TCS (typically mixed in a molar ratio of DCS/TCS of 5 mol % or less).

However, the studies of the present inventors showed that when the mixture of DCS and TCS is used as the raw material gas while the molar ratio of DCS to TCS contained in the raw material gas is adjusted according to the reaction progress, in particular, the molar ratio of dichlorosilane to trichlorosilane contained in the raw material gas is adjusted to 10 mol % or more at any point of the deposition step of polycrystalline silicon, the growth rate of silicon rod can be controlled to an optimal value, and the maximum growth diameter of rod can be more increased.

That is, the studies of the present inventors showed that the molar ratio of DCS to TCS is increased to 10 mol % or more at the initial stage of the reaction so as to increase the growth rate of rod. In addition, for pyrolysis of TCS, the center temperature of the silicon rod is increased around the melting point of polycrystalline silicon (approximately 1414° C.) at the later stage of the reaction. In this regard, it was found that when the molar ratio of DCS to TCS is increased to 10 mol % or more, meltdown of the rod can be prevented, and the growth of the silicon rod can be also induced more effectively. It was also found that the productivity can be more improved by combining the methods at the initial and later stages of the reaction, or by adjusting the molar ratio of DCS to TCS to 10 mol % or more according to the reaction progress.

Hereinafter, the manufacturing method according to each embodiment of the present invention will be described.

As described above, according to one embodiment of the present invention, provided is a method for manufacturing polysilicon, comprising the steps of reacting a raw material gas containing dichlorosilane and trichlorosilane with a reducing gas to deposit polycrystalline silicon on a silicon rod in a reactor provided with the hot silicon rod; and adjusting a molar ratio of dichlorosilane to trichlorosilane contained in the raw material gas according to the reaction progress during the deposition step of polycrystalline silicon.

In this regard, the molar ratio of dichlorosilane to trichlorosilane contained in the raw material gas may be adjusted to 10 mol % or more at any point of the deposition step.

Specifically, according to one embodiment of the present invention, the deposition step of polycrystalline silicon may be performed to have a molar ratio of dichlorosilane to trichlorosilane contained in the raw material gas of 10 to 65 mol % until the process of the following Formula is progressed to any point of 20 to 50%; and less than 10 mol % until the reaction is terminated since the above point:

Progress rate of process(%)={$(D_T-D_0)/(D_E-D_0)$}×100  [Formula]

wherein $D_0$ is a diameter of silicon rod before reaction, $D_E$ is a diameter of silicon rod after termination of reaction, and $D_T$ is a diameter of silicon rod at any point of reaction ($D_0 \leq D_T \leq D_E$).

That is, as in the above embodiment, at the early stage of the reaction where the silicon rod has the relatively small diameter and surface area and the reaction rate is slow (until the process is progressed to any point of 20 to 50%; preferably to any point of 25 to 45%; more preferably to any point of 30 to 40%), the molar ratio of DCS to TCS is adjusted to 10 to 65 mol %, preferably 10 to 60 mol %, and more preferably 15 to 55 mol % so as to increase the molar ratio of DCS contained in the raw material gas, thereby increasing the growth rate of the silicon rod.

In this regard, in order to exert the minimal effect of improving the growth rate of the silicon rod, it is preferable that the molar ratio of DCS to TCS contained in the raw material gas is 10 mol % or more. In addition, since the deposition yield of DCS into silicon is lower than TCS, excessive amount of DCS is mixed to reduce the productivity. In order to prevent this problem, it is preferable that the molar ratio of DCS to TCS contained in the raw material gas is 65 mol % or less.

The molar ratio is adjusted to less than 10 mol %, preferably less than 10 mol % over 2 mol %, and more preferably 2 to 8 mol % to induce the efficient growth of silicon rod by TCS until the reaction is terminated since the above point.

Herein, the diameter of the silicon rod may be measured using a rod diameter measuring device provided in the reactor. In the rod diameter measuring device, for example, the composition of the discharge gas is analyzed by a gas chromatograph or the like, and from the relationship with an accumulated amount of the supply of DCS and TCS, the weight of the deposited polycrystalline silicon can be obtained to calculate the rod diameter by the weight.

Meanwhile, the silicon rod should maintain its surface temperature at a predetermined temperature range suitable for deposition of polycrystalline silicon on the surface. However, the difference between the center temperature and the surface temperature of the rod increases due to convection, as the rod grows. In the previous methods, therefore, the center temperature reaches the melting point of silicon (approximately 1414° C.) as the rod grows, leading to meltdown of the rod. Thus, there is a limitation in that the rod cannot be grown to have a larger diameter (for example, 150 mm or larger).

However, the present inventors found that the molar ratio of DCS to TCS is increased at the later stage of the reaction where the silicon rod grows to some extent, so as to achieve the additional growth of the rod, because the deposition of DCS into silicon is possible at a relatively low temperature, compared to TCS, and thus silicon deposition occurs by pyrolysis of DCS at low temperature without additional increase of the center temperature of the silicon rod.

According to one embodiment of the present invention, the deposition step of polycrystalline silicon may be performed to have a molar ratio of dichlorosilane to trichlorosilane contained in the raw material gas of less than 10 mol % until the process of the above Formula is progressed to any point of 50 to 95%; and 10 to 65 mol % until the reaction is terminated since the above point.

That is, as in the above embodiment, it is difficult to increase the center temperature of the silicon rod at the later stage of the reaction because of the above described reason, the molar ratio of DCS to TCS may be adjusted to less than 10 mol % (preferably less than 10 mol % over 2 mol %, and more preferably 2 to 8 mol %) before reaching the later stage of the reaction (that is, until the process is progressed to any point of 50 to 95%, preferably to any point of 60 to 90%, and more preferably to any point of 70 to 85%).

Further, the molar ratio of DCS to TCS may be increased to 10 to 65 mol %, preferably 10 to 60 mol %, and more preferably 15 to 55 mol % so as to induce the additional growth of the silicon rod at the later stage of reaction, until the reaction is terminated since the above point.

In this regard, the difference between the center temperature and the surface temperature of the silicon rod may increase at the later stage of deposition step of the polycrystalline silicon. In the manufacturing method according to the present invention, the center temperature of the silicon rod is measured to adjust the molar ratio of DCS to TCS. That is, according to the above embodiment, when the center temperature ($T_S$) of the silicon rod reaches around the melting point (approximately 1414° C.) of the polycrystalline silicon, the center temperature of the silicon rod is measured to increase the molar ratio of DCS to TCS contained in the raw material gas to 10 to 65 mol %, preferably 10 to 60 mol %, and more preferably 15 to 55 mol %. Through this procedure, even though the center temperature of the silicon rod is not increased, silicon deposition may occur by pyrolysis of DCS at a low temperature, leading to further growth of the rod.

Meanwhile, as described above, it is apparent that the method of improving the growth rate of the rod by increasing the molar ratio of DCS to TCS at the initial stage of the deposition step of polycrystalline silicon, or a method of inducing further growth of the rod by increasing the molar ratio of DCS to TCS at the later stage of the step may be performed in a single reactor at the same time, thereby more improving the productivity.

According to another embodiment of the present invention, the deposition step of polycrystalline silicon may be performed to have the molar ratio of dichlorosilane to trichlorosilane contained in the raw material gas of 10 to 65 mol % until the process of the above Formula is progressed to any point of 20 to 50% (first point);

less than 10 mol % until the process is progressed to any point of 50 to 95% (second point) since the above point (first point); and 10 to 65 mol % until the reaction is terminated since the above point (second point).

That is, at the early stage of the reaction where the rod has the relatively small surface area and the reaction rate is slow (until the process is progressed to any point of 20 to 50%; preferably to any point of 25 to 45%; more preferably to any point of 30 to 40%), the molar ratio of DCS to TCS is increased to 10 to 65 mol %, preferably 10 to 60 mol %, and more preferably 15 to 55 mol % so as to increase the molar ratio of DCS contained in the raw material gas, thereby greatly increasing the growth rate of the silicon rod.

Thereafter, before reaching the later stage of the reaction (that is, the process is progressed to any point of 50 to 95%, preferably to any point of 60 to 90%, and more preferably to any point of 70 to 85%), the molar ratio of DCS to TCS may be adjusted to less than 10 mol % (preferably less than 10 mol % over 2 mol %, and more preferably 2 to 8 mol %).

Further, until the reaction is terminated since the above point, the molar ratio of DCS to TCS may be increased to 10 to 65 mol %, preferably 10 to 60 mol %, and more preferably 15 to 55 mol %, leading to further growth of the silicon rod even at the later stage of the reaction.

Meanwhile, according to still another embodiment of the present invention, the deposition step may be adjusted to have an average molar ratio of dichlorosilane to trichlorosilane contained in the raw material gas of 10 mol % or more according to the reaction progress.

That is, the manufacturing method according to the above embodiment is a method of adjusting the average molar ratio of DCS to TCS to 10 mol % or more throughout the deposition step. Therefore, while the center temperature of the silicon rod is maintained below the melting point of the polycrystalline silicon, the final diameter of the silicon rod can be increased to 200 mm or larger with high energy efficiency.

In this regard, the molar ratio of DCS to TCS contained in the raw material gas is adjusted according to the reaction progress. That is, the average molar ratio is adjusted to 10 mol % or more, preferably 10 to 60 mol %, more preferably 15 to 55 mol %, and most preferably 25 to 55 mol %, thereby achieving optimum productivity.

For the improvement of productivity, it is advantageous that the molar ratio of dichlorosilane to trichlorosilane contained in the raw material gas is adjusted to 10 mol % or more, preferably 20 mol % or more, and more preferably 30 mol % or more throughout the deposition step, thereby adjusting the average molar ratio within the above described range.

Herein, the adjustment of the molar ratio according to the reaction progress is performed while the average molar ratio through the entire reaction is maintained within the above described range, and thus the variation of the molar ratio according to the reaction progress is not particularly limited.

Meanwhile, in each manufacturing method according to the above described embodiments, it is preferable that the center temperature (TO of the silicon rod is adjusted at a predetermined temperature to be lower than the melting point of polycrystalline silicon, in order to prevent meltdown of the rod.

That is, the silicon rod should maintain an appropriate surface temperature for the deposition of polycrystalline silicon on its surface, and a temperature difference between the center and the surface of the rod increases due to convection, as the rod grows. Thus, in order to prevent meltdown of the silicon rod, it is preferable that the center temperature of the rod is controlled to be lower than the melting point of polycrystalline silicon (preferably lower than 1414° C.).

Further, in each manufacturing method according to the above described embodiments, the surface temperature of the silicon rod can be maintained at 1000 to 1200° C., preferably 1050 to 1200° C., and more preferably 1050 to 1150° C.

That is, for sufficient deposition of polycrystalline silicon from the raw material gas containing DCS and TCS on the surface of silicon rod and production of the rod having a sufficient diameter, it is advantageous that the surface temperature of the silicon rod is maintained within the above described range. In this regard, the surface temperature of the silicon rod may be measured through a sight glass using a radiation thermometer.

Meanwhile, in each manufacturing method according to the above described embodiments, it is preferable that the raw material gas containing DCS and TCS is pre-heated and supplied to the reactor.

When the pre-heated raw material gas is supplied, the heat quantity escaping due to the convection heat transfer from the surface of silicon rod to the raw material gas can be reduced. Therefore, the reaction efficiency can be more improved by suppressing an increase in the temperature of the center portion of the rod. In this regard, a pre-heating temperature of the raw material gas is not particularly limited. However, according to one embodiment of the present invention, it is advantageous that the temperature is adjusted to 50 to 500° C., preferably 75 to 400° C., and more preferably 100 to 300° C., considering the pre-heating effects.

According to the present invention, the reducing gas used in the deposition step of polycrystalline silicon may be hydrogen gas ($H_2$).

Herein, the molar ratio of the reducing gas to the raw material gas may be adjusted to 1:1 to 1:40, preferably 1:1 to 1:30, and more preferably 1:1 to 1:20. That is, in order to induce a rapid growth of the silicon rod without deposition of polycrystalline silicon from the raw material gas in a gas phase, the molar ratio of the reducing gas to the raw material gas is preferably adjusted within the above describe range.

The silicon rod formed by the manufacturing method of the present invention may have a final diameter of 140 to 220 mm, preferably 150 to 210 mm, and more preferably 150 to 200 mm.

As in the previous methods, that is, when DCS is not used as the raw material gas or it is used at a ratio of 5 mol % or less based on the total amount of the raw material gas, there is a limitation in increasing the final diameter of the silicon rod to 150 mm or larger, regarding the center temperature of the silicon rod. However, according to the manufacturing method according to the present invention, even though the raw material gas containing TCS and DCS is used, its molar ratio is adjusted according to the reaction progress so as to induce the deposition of polycrystalline silicon at much lower temperature and stably to increase the final diameter of the silicon rod to 140 to 220 mm.

Meanwhile, as in the above described embodiments, the method of facilitating the growth of silicon rod by adjusting the molar ratio of DCS to TCS contained in the raw material gas according to the reaction progress or changes in the center temperature of the silicon rod can be applied to Siemens deposition method, and also to a fluidized bed reactor method. As will be appreciated by those skilled in the art, all of the above described methods may be readily applied thereto, and therefore, descriptions thereof are not particularly limited.

Hereinafter, the preferred Examples are provided for better understanding. However, the following Examples are for illustrative purposes only, and the invention is not intended to be limited by these Examples.

Example 1

Polysilicon was produced using a reactor having a structure as shown in FIG. 1.

In this regard, the number of silicon rods (initial diameter of approximately 7 mm) installed inside the reactor was total 54, and the pressure inside the reactor was adjusted to approximately 6 bar absolute.

Dichlorosilane (DCS) and trichlorosilane (TCS) were contained in a raw material gas, and hydrogen gas ($H_2$) was mixed with the raw material gas at a molar ratio of hydrogen gas ($H_2$) to the raw material gas of approximately 1:8. The raw material gas was pre-heated to approximately 175° C., and a supply amount of the raw material gas per square millimeter of the surface of the silicon rod was approximately $2.0 \times 10^{-7}$ (mol/sec/mm$^2$).

The current value was set to maintain the average surface temperature of the silicon rod at approximately 1150° C. When the diameter of the silicon rod became approximately 150 mm, it was determined that the process was progressed to 100%, and the energy consumption required for silicon deposition and production was measured.

Herein, polysilicon was manufactured according to the reaction progress. That is, until the process of the following Formula reached approximately 20%, the molar ratio of DCS to TCS contained in the raw material gas was adjusted to approximately 20 mol %, and then until the reaction was completed, the molar ratio of DCS to TCS contained in the raw material gas was adjusted to approximately 5 mol %.

$$\text{Process progress}(\%) = \{(D_T - D_0)/(D_E - D_0)\} \times 100 \quad \text{[Formula]}$$

wherein $D_0$ is a diameter of silicon rod before reaction (initial rod diameter of approximately 7 mm in Example 1), $D_E$ is a diameter of silicon rod after termination of reaction (final rod diameter of 150 mm in Example 1), and $D_T$ is a diameter of silicon rod at any point of reaction ($D_0 \leq D_T \leq D_E$).

In this regard, the molar ratio (DCS/TCS) of chlorosilanes contained in the raw material gas according to the process progress is shown in the following Table 1, and the production amount of silicon (kg/h) per unit hour and energy consumption per unit production amount (kWh/kg) until termination of the reaction are shown in Table 2.

Example 2

Polysilicon was manufactured according to the reaction progress in the same manner and under the same conditions as in Example 1, except that until the process reached approximately 50%, the molar ratio of DCS to TCS contained in the raw material gas was adjusted to approximately 50 mol %, and then until the reaction was completed, the molar ratio of DCS to TCS contained in the raw material gas was adjusted to approximately 5 mol %.

Example 3

Polysilicon was manufactured according to the reaction progress in the same manner and under the same conditions as in Example 1, except that until the process reached approximately 40%, the molar ratio of DCS to TCS contained in the raw material gas was adjusted to approximately 65 mol %, and then until the reaction was completed, the molar ratio of DCS to TCS contained in the raw material gas was adjusted to approximately 5 mol %.

Example 4

Polysilicon was manufactured according to the reaction progress in the same manner and under the same conditions as in Example 1, except that until the process reached approximately 80%, the molar ratio of DCS to TCS contained in the raw material gas was adjusted to approximately 5 mol %, and then until the reaction was completed, the molar ratio of DCS to TCS contained in the raw material gas was adjusted to approximately 20 mol %.

Example 5

Polysilicon was manufactured according to the reaction progress in the same manner and under the same conditions as in Example 1, except that until the process reached approximately 50%, the molar ratio of DCS to TCS contained in the raw material gas was adjusted to approximately 5 mol %, and then until the reaction was completed, the molar ratio of DCS to TCS contained in the raw material gas was adjusted to approximately 50 mol %.

Example 6

Polysilicon was manufactured according to the reaction progress in the same manner and under the same conditions as in Example 1, except that until the process reached approximately 95%, the molar ratio of DCS to TCS contained in the raw material gas was adjusted to approximately 5 mol %, and then until the reaction was completed, the molar ratio of DCS to TCS contained in the raw material gas was adjusted to approximately 65 mol %.

Example 7

Polysilicon was manufactured according to the reaction progress in the same manner and under the same conditions as in Example 1, except that until the process reached approximately 20%, the molar ratio of DCS to TCS contained in the raw material gas was adjusted to approximately 20 mol %, until the process reached approximately 80%, the molar ratio of DCS to TCS contained in the raw material gas was adjusted to approximately 5 mol %, and then until the reaction was completed, the molar ratio of DCS to TCS contained in the raw material gas was adjusted to approximately 20 mol %.

Example 8

Polysilicon was manufactured according to the reaction progress in the same manner and under the same conditions as in Example 1, except that until the process reached approximately 50%, the molar ratio of DCS to TCS contained in the raw material gas was adjusted to approximately 50 mol %, until the process reached approximately 95%, the molar ratio of DCS to TCS contained in the raw material gas was adjusted to approximately 5 mol %, and then until the reaction was completed, the molar ratio of DCS to TCS contained in the raw material gas was adjusted to approximately 20 mol %.

Example 9

Polysilicon was manufactured in the same manner and under the same conditions as in Example 1, except that the molar ratio of DCS to TCS was adjusted to the process progress, as shown in the following table 1.

Comparative Example 1

Polysilicon was manufactured in the same manner and under the same conditions as in Example 1, except that the raw material gas having the molar ratio of DCS to TCS of approximately 5 mol % was used for the entire reaction.

TABLE 1

| | | Process progress (%) | | | | | | | |
|---|---|---|---|---|---|---|---|---|---|
| | | 0 | 20 | 40 | 50 | 60 | 80 | 95 | 100 |
| DCS/ | Example 1 | 20 | 20 | 5 | 5 | 5 | 5 | 5 | 5 |
| TCS | Example 2 | 50 | 50 | 50 | 50 | 5 | 5 | 5 | 5 |
| (mol %) | Example 3 | 65 | 65 | 65 | 5 | 5 | 5 | 5 | 5 |
| | Example 4 | 5 | 5 | 5 | 5 | 5 | 20 | 20 | 20 |
| | Example 5 | 5 | 5 | 5 | 50 | 50 | 50 | 50 | 50 |
| | Example 6 | 5 | 5 | 5 | 5 | 5 | 5 | 65 | 65 |
| | Example 7 | 20 | 20 | 5 | 5 | 5 | 20 | 20 | 20 |
| | Example 8 | 50 | 50 | 50 | 50 | 5 | 5 | 20 | 20 |
| | Example 9 | 20 | 25 | 30 | 35 | 40 | 45 | 50 | 50 |
| | Comparative Example 1 | 5 | 5 | 5 | 5 | 5 | 5 | 5 | 5 |

TABLE 2

| | Silicon Productivity (kg/h) | Energy consumption (kWh/kg) |
|---|---|---|
| Example 1 | 50.8 | 53.0 |
| Example 2 | 59.6 | 47.2 |
| Example 3 | 58.8 | 48.2 |
| Example 4 | 51.7 | 50.2 |
| Example 5 | 60.7 | 41.6 |
| Example 6 | 52.1 | 49.6 |
| Example 7 | 54.0 | 49.0 |

TABLE 2-continued

| | Silicon Productivity (kg/h) | Energy consumption (kWh/kg) |
|---|---|---|
| Example 8 | 61.5 | 45.4 |
| Example 9 | 66.4 | 39.6 |
| Comparative Example 1 | 48.8 | 54.1 |

As shown in Tables 1 and 2, the manufacturing method of Comparative Example 1 was performed without adjustment of the molar ratio of chlorosilanes contained in the raw material gas according to the process progress. That is, as in the previous methods, the raw material gas having the molar ratio of DCS of approximately 5 mol % or less was used for the entire reaction, resulting in the lowest polysilicon production per unit time and the highest energy consumption.

In contrast, the manufacturing methods of Examples 1 to 9 were performed to adjust the molar ratio of chlorosilanes contained in the raw material gas according to the process progress (at the initial stage of the reaction, or at the later stage of the reaction, or at the initial and later stages of the reaction, or through the entire reaction). As a result, high polysilicon production per unit time and low energy consumption were found, indicating improvement in the overall productivity.

Example 10

Polysilicon was manufactured in the same manner and under the same conditions as in Example 1, except that while the molar ratio of DCS to TCS was adjusted to the process progress, the average molar ratio was adjusted to approximately 50 mol %; and the current value was set to maintain the average surface temperature of the silicon rod at approximately 1050° C., as shown in the following table 3.

In addition, the molar ratio of chlorosilanes (DCS/TCS) contained in the raw material gas according to the process progress is shown in the following Table 3, the average surface temperature of the silicon rod is shown in Table 4, changes in the center temperature of the rod according to variation in the diameter (mm) of the silicon rod were measured and shown in Table 5, and the production amount of silicon (kg/h) per unit hour and energy consumption per unit production amount (kWh/kg) until termination of the reaction are shown in Table 6, respectively.

Example 11

Polysilicon was manufactured in the same manner and under the same conditions as in Example 1, except that while the molar ratio of DCS to TCS was adjusted to the process progress, the average molar ratio was adjusted to approximately 50 mol %; and the current value was set to maintain the average surface temperature of the silicon rod at approximately 1100° C., as shown in the following table 3.

Example 12

Polysilicon was manufactured in the same manner and under the same conditions as in Example 1, except that while the molar ratio of DCS to TCS was adjusted to the process progress, the average molar ratio was adjusted to approximately 50 mol %; the current value was set to maintain the average surface temperature of the silicon rod at approximately 1100° C.; and when the diameter of the silicon rod became approximately 175 mm, it was determined that the process was progressed to 100%, as shown in the following table 3.

Example 13

Polysilicon was manufactured in the same manner and under the same conditions as in Example 1, except that while the molar ratio of DCS to TCS was adjusted to the process progress, the average molar ratio was adjusted to approximately 50 mol %; the current value was set to maintain the average surface temperature of the silicon rod at approximately 1100° C.; and when the diameter of the silicon rod became approximately 200 mm, it was determined that the process was progressed to 100%, as shown in the following table 3.

Comparative Example 2

Polysilicon was manufactured in the same manner and under the same conditions as in Example 1, except that the raw material gas having the molar ratio of DCS to TCS of approximately 5 mol % was used for the entire reaction; and the current value was set to maintain the average surface temperature of the silicon rod at approximately 1200° C.

TABLE 3

|  |  | Progress rate of process (%) |  |  |  |  |  |  |  |  |
|---|---|---|---|---|---|---|---|---|---|---|
|  |  | 0 | 20 | 40 | 50 | 60 | 80 | 95 | 100 | Average |
| DCS/ | Example 10 | 60 | 55 | 45 | 35 | 35 | 45 | 55 | 65 | 49.4 |
| TCS | Example 11 | 65 | 60 | 45 | 35 | 35 | 45 | 55 | 60 | 50 |
| (mol | Example 12 | 65 | 60 | 45 | 25 | 25 | 55 | 60 | 65 | 50 |
| %) | Example 13 | 60 | 55 | 40 | 30 | 35 | 50 | 60 | 65 | 49.4 |
|  | Comparative Example 2 | 5 | 5 | 5 | 5 | 5 | 5 | 5 | 5 | 5 |

TABLE 4

|  | Example 10 | Example 11 | Example 12 | Example 13 | Comparative Example 2 |
|---|---|---|---|---|---|
| Surface temperature of silicon rod (° C.) | 1050 | 1100 | 1100 | 1100 | 1200 |

TABLE 5

| | | Center temperature (° C.) of silicon rod according to reaction progress | | | | |
|---|---|---|---|---|---|---|
| | | Example 10 | Example 11 | Example ple 12 | Example ple 13 | Comparative Example 2 |
| Diameter of silicon rod according to reaction progress (mm) | 7 | 1068 | 1121 | 1121 | 1121 | 1227 |
| | 30 | 1095 | 1152 | 1152 | 1152 | 1265 |
| | 55 | 1113 | 1171 | 1171 | 1171 | 1288 |
| | 75 | 1131 | 1190 | 1190 | 1190 | 1311 |
| | 100 | 1158 | 1219 | 1219 | 1219 | 1341 |
| | 125 | 1194 | 1257 | 1257 | 1257 | 1381 |
| | 150 | 1212 | 1275 | 1275 | 1275 | 1399 |
| | 175 | — | — | 1283 | 1283 | — |
| | 200 | — | — | — | 1291 | — |

TABLE 6

|  | Silicon Productivity (kg/h) | Energy consumption (kWh/kg) |
|---|---|---|
| Example10 | 60 | 38 |
| Example11 | 73 | 35 |
| Example12 | 87 | 33 |
| Example13 | 100 | 31 |
| Comparative Example2 | 60 | 49 |

As shown in Tables 3 to 6, the manufacturing method of Example 10 showed the silicon production amount equal to that of Comparative Example 2 and 20% or higher reduction in the energy consumption per unit production amount under the condition of a lower surface temperature of silicon rod.

In particular, the manufacturing methods of Examples 11 to 13 were found to stably maintain the center temperature of the silicon rod below the melting point of polycrystalline silicon and stably increase the final diameter of the silicon rod to 200 mm, because the raw material gas having high content of DCS for silicon deposition even at a relatively low temperature was used according to the process progress in the methods. Also, the manufacturing methods of Examples 11 to 13 were found to reduce the energy consumption per unit production amount, thereby more stably producing a large amount of polysilicon.

In contrast, the manufacturing method of Comparative Example 2 maintained the center temperature of the silicon rod at a high temperature, showing higher silicon production than the manufacturing method of Comparative Example 1. The production amount was equal to that of the manufacturing method of Example 10, but high energy consumption per unit production amount was still observed. In particular, the manufacturing method of Comparative Example 2 increased the center temperature of the silicon rod to the melting point of polycrystalline silicon (approximately 1414° C.) when the silicon rod grew to have a diameter of approximately 150 mm, and thus the reaction could not be further proceeded.

The invention claimed is:
1. A method for manufacturing polysilicon, comprising the steps of:
   reacting a raw material gas pre-heated to 50 to 500° C. containing dichlorosilane and trichlorosilane with hydrogen ($H_2$) gas to deposit polycrystalline silicon on a silicon rod in a reactor provided with the silicon rod, and
   adjusting a molar ratio of dichlorosilane to trichlorosilane contained in the raw material gas according to the reaction progress during the deposition step of polycrystalline silicon;
   wherein a molar ratio of hydrogen ($H_2$) gas to the raw material gas is 1:1 to 1:40;
   wherein the surface temperature of the silicon rod is maintained at 1000 to 1200° C.;
   wherein the deposition step is performed to have the molar ratio of dichlorosilane to trichlorosilane contained in the raw material gas of 20 to 65 mol % until the process of the following Formula is progressed to any point of 20 to 50%; and
   2 to 8 mol % until the reaction is terminated since the above point:

Progress rate of process (%)=$\{(D_T-D_0)/(D_E-D_0)\}\times 100$     [Formula]

wherein $D_0$ is a diameter of silicon rod before reaction, $D_E$ is a diameter of silicon rod after termination of reaction, and $D_T$ is a diameter of silicon rod at any point of reaction ($D_0 \leq D_T \leq D_E$).

2. The method for manufacturing polysilicon according to claim 1, wherein the deposition step is adjusted to have an average molar ratio of dichlorosilane to trichlorosilane contained in the raw material gas of 10 mol % or more according to the reaction progress.

3. The method for manufacturing polysilicon according to claim 1, wherein the deposition step is performed to maintain the center temperature of the silicon rod below a melting point of polycrystalline silicon.

4. The method for manufacturing polysilicon according to claim 1, wherein the silicon rod produced by the deposition step has a final diameter of 140 to 220 mm.

* * * * *